United States Patent [19]
Chene et al.

[11] Patent Number: 6,138,783
[45] Date of Patent: Oct. 31, 2000

[54] DRIVE UNIT SUITABLE FOR COUPLING TO A WHEELED BODY, AND RESULTING VEHICLE

[75] Inventors: Richard C. Chene, Neuilly sur Seine; Dominique V. Delamour, Les Mesnuls; Olivier J. Rodi, Saulx-Marchais, all of France

[73] Assignees: Compagnie Generale d'Enterprises Automobiles "C.G.E.A.", Nanterre; R&D Industries, Mesnuls, both of France

[21] Appl. No.: 09/091,156

[22] PCT Filed: Dec. 13, 1996

[86] PCT No.: PCT/FR96/01994

§ 371 Date: Jun. 9, 1998

§ 102(e) Date: Jun. 9, 1998

[87] PCT Pub. No.: WO97/21585

PCT Pub. Date: Jun. 19, 1997

[30] Foreign Application Priority Data

Dec. 13, 1995 [FR] France .................... 95 14765

[51] Int. Cl.[7] ............................................. B62M 7/14
[52] U.S. Cl. .................. 180/11; 180/299; 296/26.08
[58] Field of Search .............. 180/11, 12, 14.1, 180/291, 295, 299; 296/26.08, 196, 197, 194, 195

[56] References Cited

U.S. PATENT DOCUMENTS 3,392,857  7/1968  Tantlinger .
4,368,793  1/1983  Igarashi ....................................... 180/11
4,413,692  11/1983  Clifft .......................................... 180/11
4,469,369  9/1984  Belik et al. ............................... 296/197
4,475,611  10/1984  Fisher ........................................ 180/6.5

FOREIGN PATENT DOCUMENTS

| | | |
|---|---|---|
| 0 443 309 | 8/1991 | European Pat. Off. . |
| 0 533 028 | 3/1993 | European Pat. Off. . |
| 0 631 917 | 1/1995 | European Pat. Off. . |
| 0 633 173 | 1/1995 | European Pat. Off. . |
| 93 06 486 | 9/1993 | Germany . |
| 295 06 123 | 10/1995 | Germany . |
| WO 97/05873 | 10/1987 | WIPO . |

*Primary Examiner*—Paul N. Dickson
*Assistant Examiner*—Avraham H. Lerner
*Attorney, Agent, or Firm*—Young & Thompson

[57] ABSTRACT

A drive unit capable of being coupled to a wheeled body to form a vehicle. The drive unit includes a construction having a frame with two opposite edges parallel to the forward direction, the frame supports a driving power source and is in turn supported along said opposite edges by a pair of side walls that are respectively supported on at least one wheel-like member and define a housing for transmission connecting the driving power source to the wheel-like members, each of the side walls has two opposite surfaces perpendicular to the forward direction, and coupling/un-coupling devices provided on the surfaces for releasably engaging the wheeled body.

10 Claims, 6 Drawing Sheets

DRIVE UNIT SUITABLE FOR COUPLING TO A WHEELED BODY, AND RESULTING VEHICLE

BACKGROUND OF THE INVENTION

Drive unit that can be coupled to a rolling body, and resulting vehicle.

The subject of the present invention is a drive unit capable of being coupled directly, by coupling/uncoupling means, to at least one body provided with rolling gear, known as a "rolling body", to form a vehicle, and to the resulting vehicle.

More specifically, the invention relates to a drive unit which comprises drive means and which is fitted with its own rolling gear, it being understood that in the present description and in the claims, the term "rolling" must not necessarily be taken literally, as will be seen later.

DESCRIPTION OF THE RELATED ART

The term "coupling/uncoupling means" is understood here to mean both means of mechanical connection (attaching the rolling body to the drive unit) and means of electrical, pneumatic or hydraulic connection for transmitting orders, information or signalling.

As far as the applicants are aware, no vehicles of the aforementioned type exist for public transport, as far as road transport is concerned. As far as the road transport of goods is concerned, lorries with semitrailers are, however, of the aforementioned type.

Trains, whether designed for transporting individuals or goods also belong to the aforementioned type.

In the case of the road transport of individuals (public transport), the drive unit is integral with the rolling body, with the exception of trailer coaches connected to certain buses via a bellows.

In the aforementioned cases where the drive unit is separate from the rolling body, the drive unit consists of the tractor and the rolling body of the trailer (road transport of goods) or the drive unit consists of the locomotive and the rolling body of at least one wagon or carriage (rail transport). In both cases, the drive unit, capable of autonomous movement, comprises at least two axles, while the rolling body also has at least one. Such an arrangement dictates the providing of an articulated system for linking together the drive unit and the rolling body, and this linking system, in the case of road vehicles, must have a wide scope for manoeuvres. Furthermore, the drive unit also forms the driver's position and therefore constitutes a complicated, expensive and bulky assembly.

SUMMARY OF THE INVENTION

The object of the present invention is to overcome these drawbacks by providing a drive unit which can be distinguished from the aforementioned ones in that it does not simultaneously form a driver's position, from which it follows that it may constitute an intermediate region or the tail of the vehicle, the driver's position being provide in the or one of the rolling transport bodies to which the drive unit is coupled, or being a special-purpose module in itself.

More specifically, the drive unit according to the invention consists of a structure formed, on the one hand, of a chassis having two opposite edges generally parallel to the direction of rolling, which chassis supports a source of motive power and is itself supported, along the said opposite edges, by a pair of side walls which in turn are each supported by at least one set of rolling gear and form housings for the passage of transmission means from the said source of motive power towards the said rolling gear, which is capable of converting the said motive power into work.

A drive unit of this type is described in the prior art as acting as a connector between two carriages of a rail vehicle. Thus, EP-A-0,633,173 discloses a self-propelled train in several parts, comprising a module, provided with rolling gear, and in the roof of which there are a diesel engine and a generator, and two carriages articulated one on each side of the said module and each of which is supported by a driving bogey. In the same vein, WO-A-87/05873 relates to a bogeyless vehicle comprising a gantry-type propulsion member which, in its top, comprises a power supply unit and, at each of its ends, has driven or non-driven rolling gear. The propulsion member disclosed is intended to take a cell for passengers or a container and is connected, at each end, to an end unit which is itself connected, via a communication passage, to an adjacent carriage.

The main drawback of these known drive units is that they cannot be connected with equal ease to carriages suitable for transporting passengers and cars for transporting goods.

The object of the invention is therefore to overcome this inadequacy of the prior art by proposing a drive unit which forms a detachable part of the vehicle to which it belongs and is capable of being coupled, by an operator of the said vehicle, to different transport bodies, so as to form a vehicle adapted to a given use.

In order to achieve this, the drive unit according to the invention is such that, on the one hand, its side walls each have two opposite faces generally perpendicular to the direction of rolling, on each of which the aforementioned coupling/uncoupling means are provided, and, on the other hand, the said coupling/uncoupling means are capable of interacting with mating coupling/uncoupling means belonging just as easily to a transport body of the container type as to a body intended for transporting passengers and/or forming a driver's position.

The unit according to the invention can be produced in numerous alternative forms involving:
  the nature of the rolling gear which may, for example, be wheels for road transport, wheels for rail transport, hybrid rail/road wheels, or even caterpillar tracks; instead of rolling gear in the strictest sense, the structure could be provided with means adapted to its movement, for example, on a cushion of air,
  the number of sets of rolling gear, when these are wheels,
  the nature of the source of motive power which may be a source of thermal or electrical power,
  the power of the source of motive power,
  the length of the drive unit (short chassis, long chassis), etc.

The appropriate combinations of these alternative forms will form so many modules that can be adapted to particular types of transport body, to suit the need or circumstances. Thus, it will be possible to modify the construction of the vehicle, depending on whether it is to run on roads or in an urban environment, incorporating into it a module that has a combustion engine or a module has an electric motor. In the event of a breakdown or the need for routine maintenance, or alternatively the need to recharge batteries in the case of an electric motor, the module requiring attention will simply be replaced by a module of the same type, without taking the transport body out of circulation. This is clearly not possible when the engine of a conventional bus requires attention.

Conversely, it will be possible for transport bodies of different types to be connected to one and the same drive unit, and this will allow the operator of the vehicle to modify the intended purpose of the vehicle while keeping the same motor, and thus to reduce operating costs. It will thus be possible, in a few hours or even less, to convert a refuse vehicle into a bus, simply by replacing the rubbish skip with a passenger-transport module. This bus will then itself be able to be converted into a container carrier, for example.

Aside from the flexibility of use and of construction offered by the drive unit according to the invention, on rails just as on road, it makes it possible for the floor of the transport body to be completely cleared of transmission members, which means that the floor can be completely flat and lowered, providing easier access to public transport for the disabled, and making it easier for the interior to be laid out with the possibility of increasing the number of seats for the same size of vehicle and, in the case of the transport of goods, allowing optimum loading.

The capacity of the vehicle can be further increased by using a drive unit which not only does not incorporate a driver's position, but also is not adapted to the normal transport of passengers or goods, and which preferably comprises just one pair of wheels and side walls whose dimension (length) in the direction of rolling does not exceed the dimensions of the drive unit (width and height) in the perpendicular plane, that is to say in the directions which are mutually perpendicular and are perpendicular to the said direction of travel. This then yields a drive unit which has minimum bulk, so that the resulting vehicle will offer a greater capacity for transport for the same track. This is a particularly advantageous alternative form of the invention, in so far as it allows the contradictory requirements imposed, on the one hand, by concerns about profitability and, on the other hand, by legislation relating to the maximum authorized track to be satisfied.

The drive unit can be inserted between two transport bodies of which one, known as the "basic rolling body" may comprise a driver's position and the other, known as the "complementary body" will not have one.

The drive unit may be inserted, as an alternative, between a module which specifically forms a driver's position and a rolling body.

Advantageously, the drive unit according to the invention may receive or comprise a floor, thus allowing, when this unit is inserted between two transport bodies, or between a special-purpose module forming a driver's position and a rolling body, persons to move between the said bodies or between the said driver's position and the said body.

As a preference, suspension means are incorporated into the side walls of the drive unit.

As mentioned earlier, the present invention is also aimed at a vehicle for transporting people and/or goods, of the type comprising, on the one hand, at least one drive unit as defined hereinabove and, on the other hand, at least one rolling body, the said drive unit and the said rolling body comprising mating coupling/uncoupling means, in which vehicle the driver's position is situated in the or in one of the rolling bodies.

In a preferred embodiment, the basic rolling body has just one axle.

The complementary body may either have a short chassis with no axle, or a long chassis with at least one axle. The long-chassis complementary body may be provided, at both ends, with coupling/uncoupling means that mate with those of the drive unit, so that the said complementary body can be inserted between two such drive units.

The special-purpose module forming the driver's position can be distinguished from the basic rolling body in that it has no rolling gear.

BRIEF DESCRIPTION OF THE DRAWINGS

The invention is described hereafter in greater detail with reference to the appended drawings in which.

DESCRIPTION OF THE PREFERRED EMBODIMENTS

Figure 1:
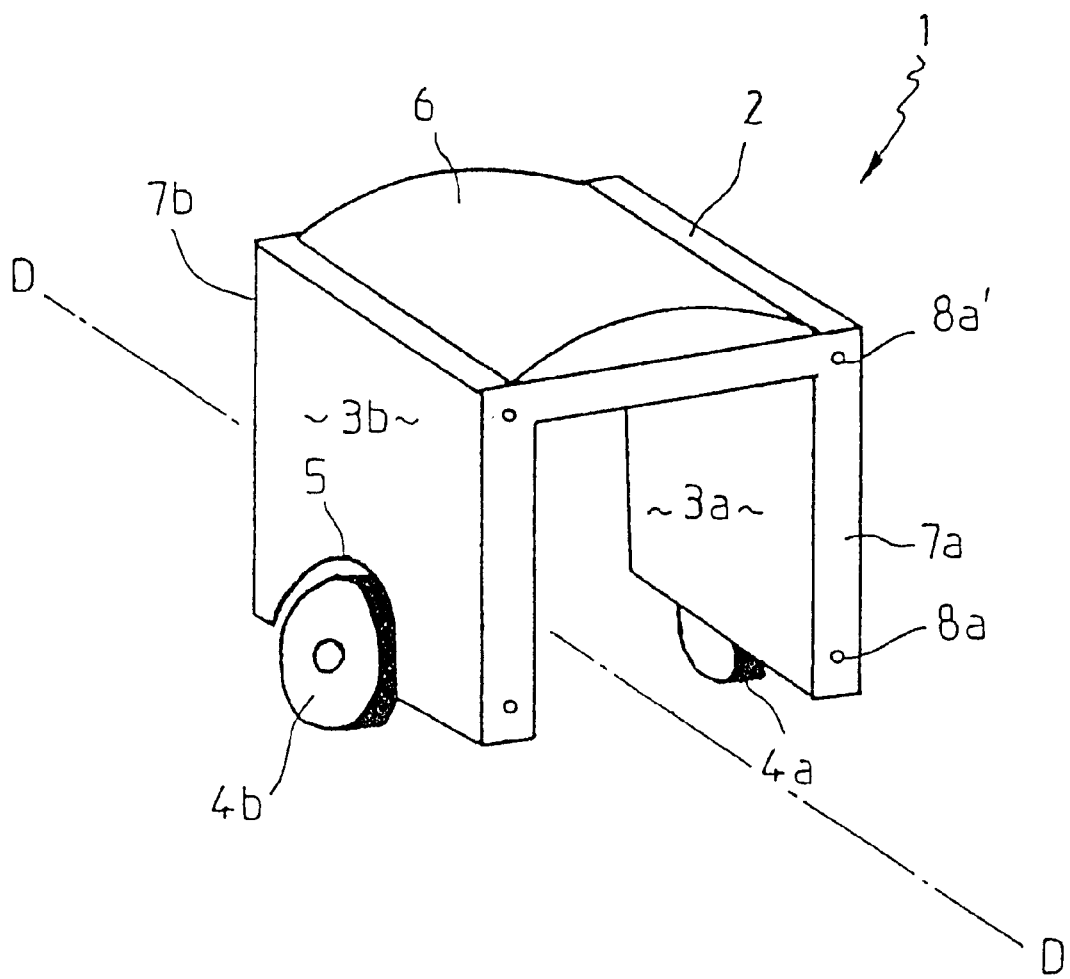
FIG. 1 is a diagrammatic perspective view of a drive unit according to the invention.

If reference is made to FIG. 1, it is possible to see a drive unit according to the invention, denoted overall by 1, with an overall structure in the shape of an inverted U. The U defines a web, or roof, 2 and two flanges, or side walls, 3a, 3b which support the roof along two of its opposite sides parallel to the direction of rolling D. A housing 5 for a drive wheel 4a, 4b is formed in each of the side walls 3a, 3b. Stand legs or stabilizers, not depicted, are provided so that the unit can be kept in the position illustrated.

As is clearly apparent from FIG. 1, the drive unit 1 has no driver's position.

The roof 2 of the unit constitutes a chassis which supports a shrouded power source 6. The unit 1 further comprises a proximal end 7a (with respect to a basic rolling body to which the drive unit will be connected) and an opposite, distal, end 7b. The proximal end and distal end are of course perpendicular to the direction of rolling D. Means such as 8a, 8a', etc., of coupling/uncoupling to the aforementioned basic rolling body are provided in the proximal end 7a, which means comprise, in addition to means of attachment between the drive unit and the said body, means of connecting electric and/or hydraulic and/or pneumatic circuits for control, information or signalling purposes between the drive unit and the rolling body. The distal end 7b of the unit 1 comprises either exactly the same coupling/uncoupling means as the proximal end 7a, which avoids having to orientate the unit 1 in a precise direction before connecting it to a basic rolling body (in which case the distal end is no different from the proximal end), or alternatively coupling/uncoupling means which are strictly limited to those necessary for connecting either with a complementary body, that is to say which do not, for example, have means to provide a connection between the starter and the engine. When there is a desire to be able to include, within the same vehicle, more than one drive unit, it will of course be necessary for the distal and proximal faces of the said units to be equipped with the same coupling/uncoupling means, particularly so that commands from the driver's position and intended for the engine or motor of the second drive unit will actually reach this engine or motor.

Figure 2:
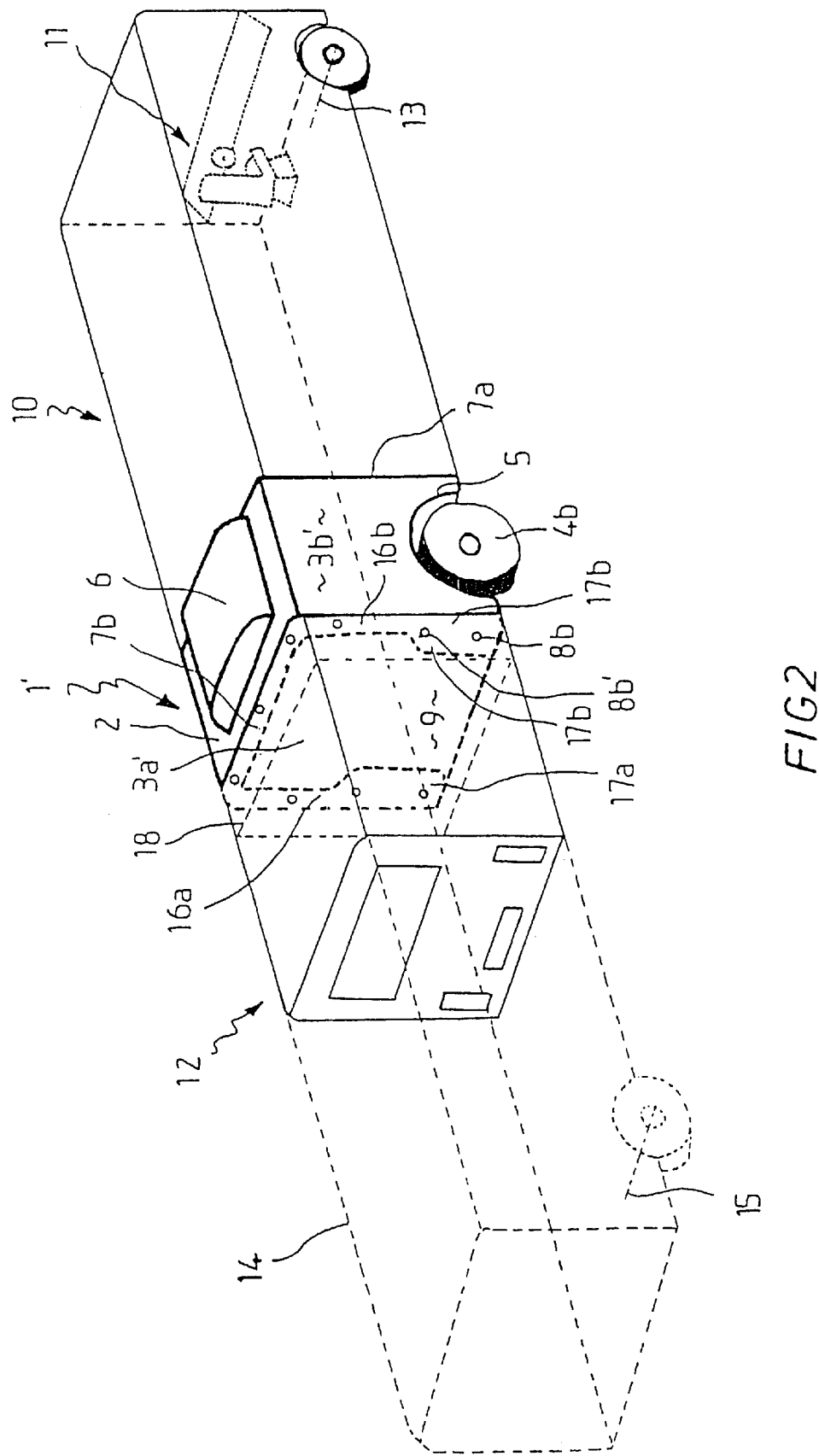
FIG. 2 is a diagrammatic perspective view of a bus according to the invention, illustrating three alternative constructions, starting from a first alternative form of structure of the drive unit, very similar to that of FIG. 1.

The construction of a vehicle, starting from the drive unit of FIG. 1, is clearly apparent from FIG. 2. In FIG. 2, the same references as in FIG. 1 have been used to denote the same parts, and the same references followed by a prime symbol have been used to denote similar parts.

The drive unit 1' of FIG. 2 exhibits minor differences compared with that of FIG. 1: the side walls 3a' and 3b' have an upper part 16a, 16b which is relatively thin and a thicker lower part 17a, 17b forming a box structure. It is within these box structures that the wheel housings are made. Furthermore, the U-shaped structure of the unit 1' is equipped with a floor 9.

As can be seen, the drive unit 1' is inserted between a basic rolling body 10 equipped with a driver's position 11, and a short-chassis complementary body 12. The basic body 10 has a single axle 13, at the front of the body, and stabilizers, not depicted, are provided at the rear in order to keep the floor of the body horizontal when this body is not connected to the unit 1'. The complementary body 12 has no wheels.

It will be understood that the engine or motor 6 is controlled from the driver's position 11. Such a vehicle is very easy to handle. This is an appreciable advantage, particularly in the case of buses which can pull away from the stops more easily.

FIG. 2 also depicts two alternative constructions of bus according to the invention, namely an alternative form using a long-chassis complementary body 14 with one axle 15, and an alternative form without a complementary body, the passenger compartment of the bus being closed at the rear by an end module 18 simply fitted with the same signalling devices as those provided at the rear of the short- or long-chassis complementary bodies.

From FIG. 2 alone it is clearly apparent that the capacity of the bus can be adapted to suit the need, for example to suit the timetable.

It will also be understood that the module 1', the engine or motor 6 of which is, for example, a diesel engine, can be replaced by a module in which the engine or motor may, for example, be an electric motor when the vehicle has to run in an environment which is particularly protected against pollution or noise. It will also be understood that such an electric drive unit running on batteries can be disconnected from the transport body or bodies and replaced by an identical electric drive unit so that the batteries can be recharged without the said transport body or bodies being taken out of circulation.

Other possible variations have been mentioned in the introductory part of this description.

Figure 3:
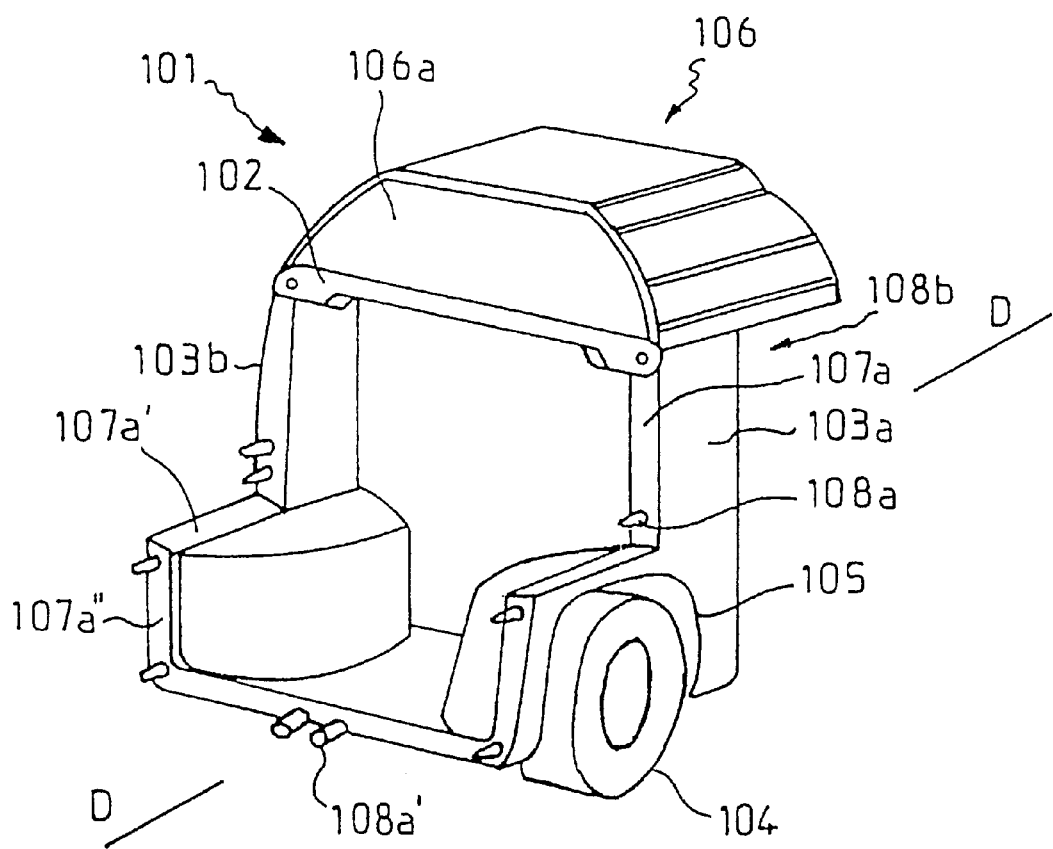
FIG. 3 is a perspective view of another alternative form of the drive unit according to the invention.

If we now examine FIG. 3, where the same references as in FIG. 1 have been used to denote the same parts, but increased by 100, it can be seen that the drive unit denoted overall by 101 comprises, on the one hand, a chassis 102 supporting a shrouded power source 106 and, on the other hand, two opposite side walls 103a, 103b which are parallel to the direction of rolling of the drive unit. A housing 105 for a drive wheel 104 is formed in each of the side walls 103a, 103b.

As before, the drive unit 101 has no driver's position and nor is it adapted for transporting of passengers or goods.

The unit 101 further comprises a proximal end (with respect to a special-purpose driver's position) which can be distinguished from the proximal end 7a of FIG. 1 in that it has three parts, namely an upper part 107a in the shape of an inverted U situated in a first plane which is approximately that of the proximal face 106a of the shrouding, a lower part 107a" in the shape of a right U situated in a second plane, approximately parallel to the first plane but at a distance from it, so that the lower part 107a" projects with respect to the upper part 107a, and an intermediate part 107a' extending from the upper part to the lower part. As can be seen in FIG. 3, the dimension of the side walls 103a, 103b of the drive unit 101, in the direction of rolling D is less than the dimension of the proximal end of the drive unit between the said walls 103a and 103b in a direction D' which is perpendicular to D. The bulk of the drive unit 101 is therefore reduced to a minimum.

Means, such as 108a, 108a', etc., of coupling/uncoupling to the driver's position are provided in the proximal end 107a and 107a".

The distal end 108b of the unit 101 comprises coupling/uncoupling means which are limited to those needed for connecting to a rolling body.

Figure 4:
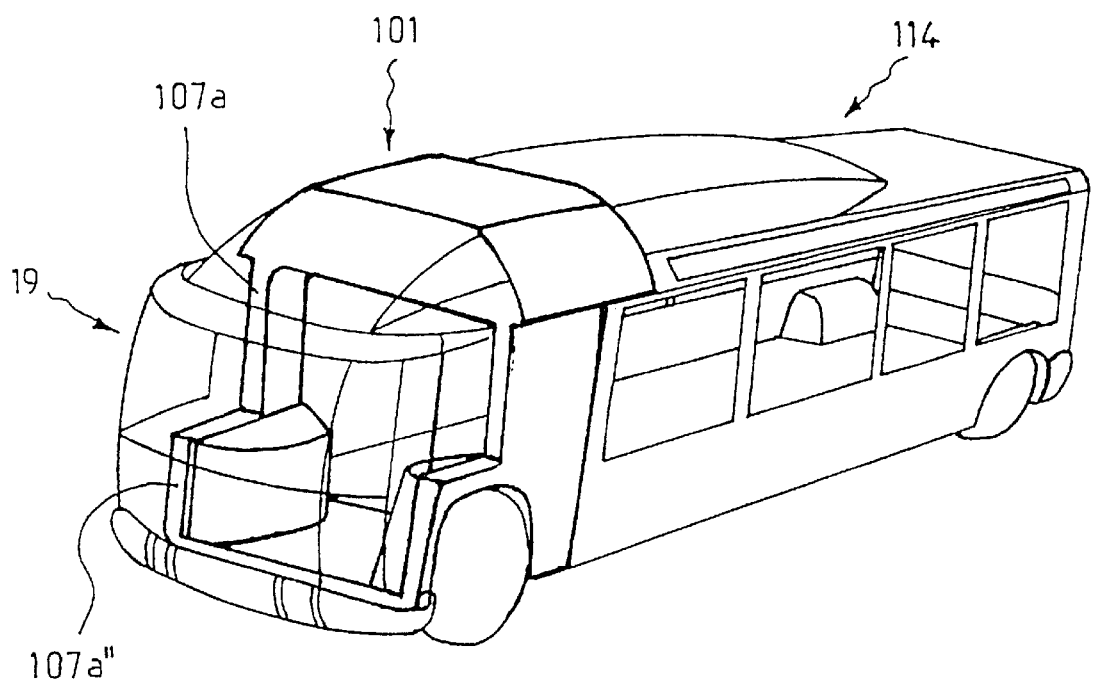
FIG. 4 is a perspective view of a bus incorporating the drive unit according to FIG. 3, and FIGS. 5A to 5C are diagrammatic perspective views illustrating the various stages in the method allowing the construction of a vehicle according to the invention to be changed, in the case where the drive unit has just one pair of wheels.

The position occupied by the drive unit 101 in a vehicle, such as a bus, is illustrated in FIG. 4.

It can be seen that the drive unit 101 is inserted between a driver's position module 19 and a rolling body 114.

The rolling body 114 has no special feature compared with the complementary body 14 of FIG. 2. However, unlike in the embodiment of FIG. 2, the driver's position 19 does not form part of a rolling body, but constitutes a special-purpose module, without wheels.

The module 19 forming the driver's position comprises, for connection with the drive unit 101, a face whose profile is mated to that of the proximal face 107a, 107a', 107a" of the drive unit 101 and which comprises coupling/uncoupling means mating with those of the said proximal face.

Figure 5A:
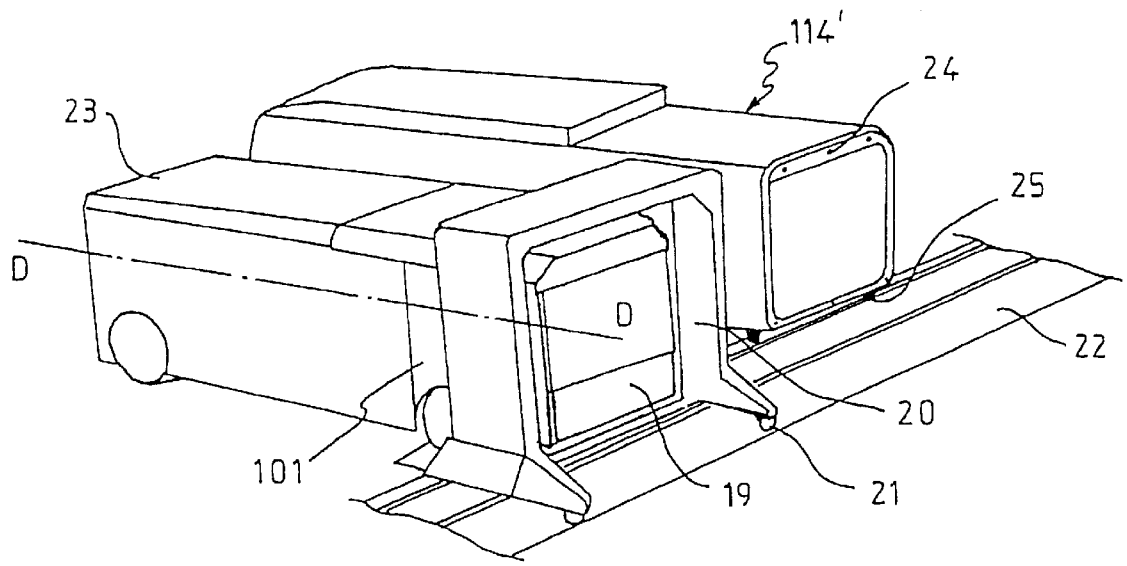
Figure 5B:
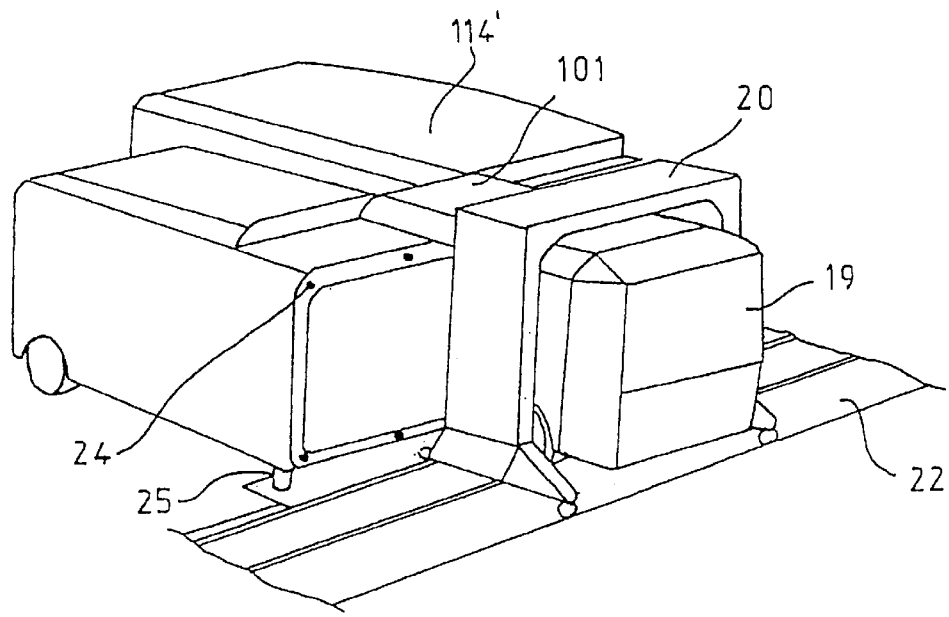
Figure 5C:
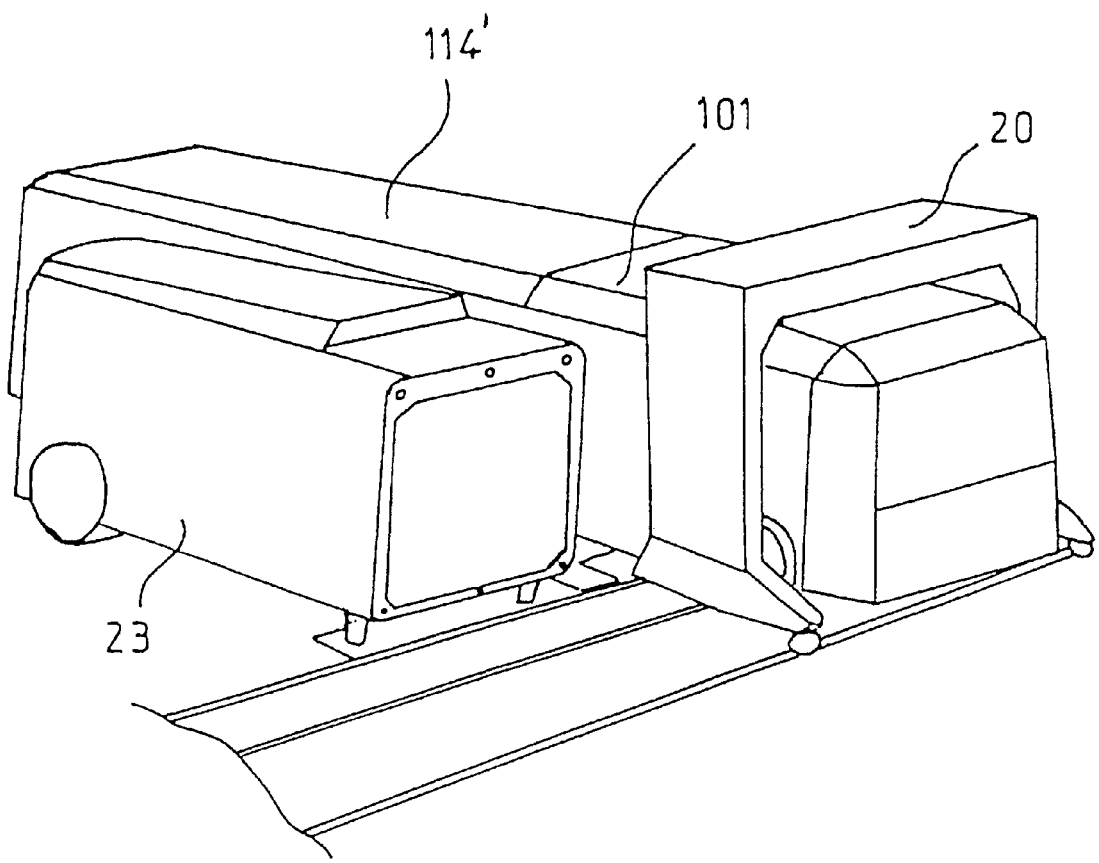

FIGS. 5A to 5C illustrate equipment allowing the operator of a vehicle according to the invention to modify the composition of the said vehicle to suit his requirements. In these figures, elements of structure identical/analogous with elements described with reference to the preceding figures are denoted by reference numbers which are identical/followed by a prime symbol, respectively.

If reference is first of all made to FIG. 5A, it is possible to see a vehicle according to the invention which is formed of a driver's position 19 connected, via a drive unit 101, to a rolling body 23, here a refuse skip. The vehicle illustrated is manoeuvred by its driver in the direction D so as to position the drive unit 101 in the space defined by a portal frame 20 mounted on rollers 21 designed to run along a runway track 22. The track 22 and the portal frame 20 are, for example, installed at the operator's depot.

In the embodiment illustrated, a rolling body 114' intended for the transport of passengers is arranged along the track 22 and is intended to be substituted for the skip 23 so as to convert the refuse vehicle described above into a bus.

To do this, the portal frame 20 is first of all engaged with the drive unit 101 so as to deactivate the means 24 that couple the latter to the skip 23. For this, it may be advantageous to provide all the equipment items (not depicted), such as a source of power, jacks etc., for achieving this deactivation on the portal frame 20 rather than on the vehicle. The vehicle can thus be lighter and enjoy lower manufacturing costs.

As illustrated in FIG. 5B, once uncoupled from the skip 23, the drive unit 101 and the associated driver's position 19 are transferred to face the rolling body 114', by sliding the portal frame 20 along the track 22. During this operation, the skip 23 is held in position by stabilizers 25, as is the rolling body 114' (FIG. 5A).

The drive unit 101 is then engaged, using the activation/deactivation equipment on the portal frame 20, with the rolling body 114' which is equipped with the same coupling/uncoupling means 24 (FIG. 5A) as the skip 23. This then gives the situation depicted in FIG. 5C, that is to say a bus ready to leave.

The stages described with reference to FIGS. 5A to 5C can be carried out in just three quarters of an hour, or half a day at the most.

It will therefore be understood that the invention provides a simple, quick and economical means of adapting a vehicle to a given use.

It is clearly understood that the present invention is not restricted to the embodiments depicted. In particular, although its application to the construction of road vehicles has been described, the invention could be applied to rail transport.

What is claimed is:

1. Drive unit (1; 101) capable of being coupled directly and linked rigidly, by coupling/uncoupling means (8a, 8a', 8b, 8b'; 108a, 108a'), to at least one rolling body (10, 14; 114) provided with rolling gear, to form a vehicle, which drive unit (1; 101) consists of a structure formed of a chassis (2; 102) having two opposite edges generally parallel to the direction of rolling (D), which chassis (2) supports a source of motive power (6) and is itself supported, along said opposite edges, by a pair of side walls (3a, 3b: 103a, 103b) which in turn are each supported by at least one set of rolling gear (4a, 4b: 104) and form housings for the passage of transmission means from said source of motive power (6) towards said rolling gear, which is capable of converting said motive power into work, wherein said side walls (3a, 3b; 103a, 103b) each have two opposite faces (7a, 7b: 107a, 107a', 107a", 108) generally perpendicular to the direction of rolling (D) and on each of which the aforementioned coupling/uncoupling means (8a, 8a', 8b, 8b'; 108a, 108a') are provided, and said coupling/uncoupling means (8a, 8a', 8b, 8b'; 108a, 108a') are capable of interacting with mating coupling/uncoupling means belonging to a transport body of the container type to a body intended for transporting passengers (12, 14; 114) and/or forming a driver's position (19, 10), so that said drive unit (1; 101) is adapted to form a detachable part of said vehicle, which can be coupled, by an operator of the vehicle, to different transport bodies, so as to form a vehicle adapted to a given use.

2. Drive unit according to claim 1, wherein the drive unit is not adapted to the normal transport of passengers or goods, or to incorporating a driver's position, and in that the dimension of its side walls (3a, 3b; 103a, 103b) in the direction of rolling (D) does not exceed its dimension in the plane perpendicular to said direction (D).

3. Drive unit (1; 101) according to claim 2, wherein the drive unit comprises a single pair of wheels (4a, 4b; 104).

4. Drive unit (1; 101) according to claim 1, wherein said rolling gear (4a, 4b; 104) comprises wheels for road transport, wheels for rail transport, hybrid rail/road wheels or caterpillar tracks.

5. Drive unit (1; 101) according to claim 1, wherein the source of motive power (6) is a source of thermal or electrical power.

6. Drive unit (1; 101) according to claim 1, wherein suspension means are incorporated into said side walls (3a, 3b; 103a, 103b).

7. Vehicle incorporating a drive unit (1; 101) capable of being coupled directly and linked rigidly, by coupling/uncoupling means (8a, 8a', 8b, 8b'; 108a, 108a'), to at least one rolling body (10, 14; 114) provided with rolling gear, to form a vehicle, which drive unit (1; 101) consists of a structure formed of a chassis (2; 102) having two opposite edges generally parallel to the direction of rolling (D), which chassis (2) supports a source of motive power (6) and is itself supported, along said opposite edges, by a pair of side walls (3a, 3b; 103a, 103b) which in turn are each supported by at least one set of rolling gear (4a, 4b; 104) and form housings for the passage of transmission means from said source of motive power (6) to said rolling gear, which is capable of converting said motive power into work, wherein said side walls (3a, 3b; 103a, 103b) each have two opposite faces (7a, 7b; 107a, 107a', 107a", 108) generally perpendicular to the direction of rolling (D) and on each of which the aforementioned coupling/uncoupling means (8a, 8a', 8b, 8b'; 108a, 108a') are provided, and said coupling/uncoupling means (8a, 8a', 8b, 8b'; 108a, 108a') are capable of interacting with mating coupling/uncoupling means belonging to a transport body of the container type to a body intended for transporting passengers (12, 14; 114) and/or forming a driver's position (19, 10), so that said drive unit (1; 101) forms a detachable part of said vehicle, which can be coupled, by an operator of the vehicle, to different transport bodies, so as to form a vehicle adapted to a given use, and wherein the drive unit is inserted between two transport bodies (10, 12; 10, 14; 19, 114).

8. Vehicle according to claim 7, wherein one of said transport bodies (12; 19) has no rolling gear.

9. Vehicle according to claim 8, wherein said transport unit with no rolling gear is a special-purpose module (19) forming a driver's position.

10. Vehicle according to claim 7, wherein one of said transport bodies (14; 114) has just one axle.

\* \* \* \* \*